US010021766B2

(12) United States Patent
Vogel

(10) Patent No.: US 10,021,766 B2
(45) Date of Patent: Jul. 10, 2018

(54) CONTROLLER FOR A HORTICULTURAL LIGHTING SYSTEM

(71) Applicant: NXP B.V., Eindhoven (NL)

(72) Inventor: Jan-Willem Vogel, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/301,839

(22) PCT Filed: Apr. 8, 2014

(86) PCT No.: PCT/EP2014/057085
§ 371 (c)(1),
(2) Date: Oct. 4, 2016

(87) PCT Pub. No.: WO2015/154798
PCT Pub. Date: Oct. 15, 2015

(65) Prior Publication Data
US 2017/0034895 A1    Feb. 2, 2017

(51) Int. Cl.
| H05B 37/00 | (2006.01) |
| H05B 37/02 | (2006.01) |
| A01G 22/00 | (2018.01) |
| A01G 1/00 | (2006.01) |
| A01G 7/04 | (2006.01) |
| A01G 9/20 | (2006.01) |
| A01G 9/26 | (2006.01) |
| H05B 33/08 | (2006.01) |

(52) U.S. Cl.
CPC ......... *H05B 37/0272* (2013.01); *A01G 1/001* (2013.01); *A01G 7/045* (2013.01); *A01G 9/20* (2013.01); *A01G 9/26* (2013.01); *A01G 22/00* (2018.02); *H05B 33/089* (2013.01); *H05B 33/0845* (2013.01); *H05B 33/0863* (2013.01); *H05B 37/0218* (2013.01); *H05B 37/0227* (2013.01); *H05B 33/0866* (2013.01)

(58) Field of Classification Search
CPC ............ H05B 37/0272; H05B 33/0863; H05B 33/0866
USPC .......................... 315/185 R, 308; 47/DIG. 6
See application file for complete search history.

(56) References Cited

U.S. PATENT DOCUMENTS

| 7,573,210 B2 * | 8/2009 | Ashdown ........... H05B 33/0818 315/149 |
| 8,738,160 B2 * | 5/2014 | Bucove .................. A01G 7/045 315/152 |
| 9,532,411 B2 * | 12/2016 | Conrad ............. H05B 33/0863 |
| 9,578,709 B2 * | 2/2017 | Huang ............... H05B 37/0227 |
| 2010/0308833 A1 | 12/2010 | Surdeanu et al. |
| 2010/0315019 A1 | 12/2010 | Hoogzaad et al. |
| 2011/0006328 A1 | 1/2011 | Surdeanu et al. |
| 2011/0012158 A1 | 1/2011 | Nguyen Hoang et al. |

(Continued)

OTHER PUBLICATIONS

International Search Report for application PCT/E02014/057085 dated Jan. 13, 2015.

*Primary Examiner* — Thuy Vinh Tran

(57) ABSTRACT

A controller (202) for a horticultural lighting system comprising: a receiver (220) configured to receive a set of lighting parameters; and one or more output terminals configured to provide lighting control signalling to an LED array (210), wherein the lighting control signalling is configured to set one or more operating parameters of the LED array (210) in accordance with the received set of lighting parameters.

15 Claims, 3 Drawing Sheets

(56) References Cited

U.S. PATENT DOCUMENTS

| | | |
|---|---|---|
| 2011/0031903 A1 | 2/2011 | Nguyen Hoang et al. |
| 2011/0080113 A1 | 4/2011 | Nguyen Hoang et al. |
| 2011/0137757 A1 | 6/2011 | Paolini et al. |
| 2013/0005401 A1 | 1/2013 | Rosenhan et al. |
| 2013/0006401 A1 | 1/2013 | Shan |
| 2013/0293156 A1* | 11/2013 | Wells .............. H05B 33/0803 315/312 |

* cited by examiner

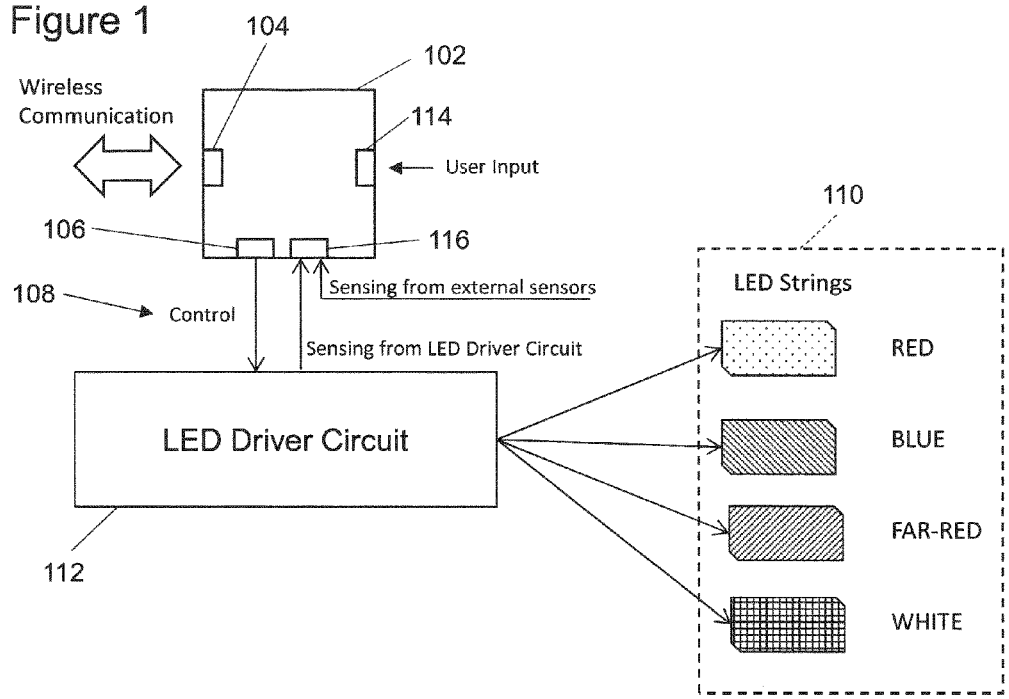
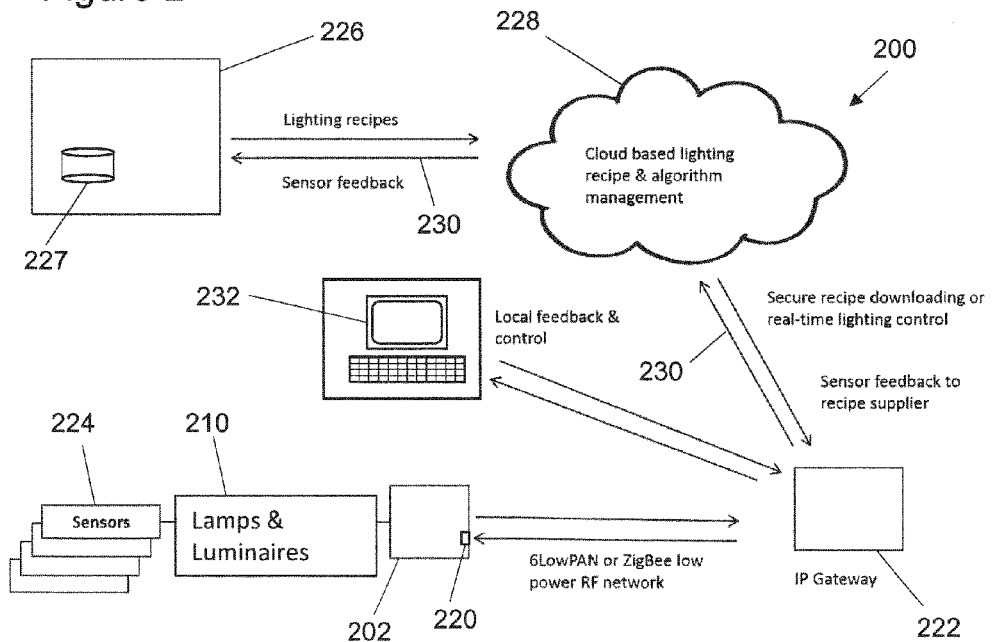

CONTROLLER FOR A HORTICULTURAL LIGHTING SYSTEM

The present disclosure relates to the field of controllers for horticultural lighting systems, and in particular, although not exclusively, to controllers that can control an LED array for providing artificial lighting for plants.

According to a first aspect of the invention, there is provided a controller for a horticultural lighting system comprising:
  a receiver configured to receive a set of lighting parameters; and
  one or more output terminals configured to provide lighting control signalling to an LED array, wherein the lighting control signalling is configured to set one or more operating parameters of the LED array in accordance with the received set of lighting parameters.

The one or more output terminals may be configured to provide lighting control signalling directly or indirectly to an LED array. For example, the lighting control signal may be provided indirectly to the LED array via an LED driver circuit.

Following receipt of a second set of lighting parameters received at the receiver, the lighting control signalling may be configured to set one or more operating parameters of the LED array in accordance with the second set of lighting parameters The controller may be configured to store the received set of lighting parameters in memory.

Following receipt of a second set of lighting parameters received at the receiver, the controller may be configured to replace in memory the received set of lighting parameters with the second set of lighting parameters.

The controller may be configured to receive the set of lighting parameters in real-time, optionally from a location remote to the LED array.

The controller may further comprise a user input receiver configured to receive user input signalling. The controller may be configured to also set one or more operating parameters of the LED array in accordance with the user input signalling.

The controller may further comprise a sensor signal receiver configured to receive sensor signalling representative of one or more characteristics of an environment in which the plants are growing, or characteristics of any of the hardware associated with the horticultural system. The controller may be configured to also set one or more operating parameters of the LED array in accordance with the sensor signalling.

The controller may be configured to use one or more properties of an operating schedule file to set one or more operating parameters of the LED array.

The controller may be configured to receive or determine a junction temperature representative of a junction temperature of one or more LEDs in the LED array. The controller may be configured to also set one or more operating parameters of the LED array in accordance with the junction temperature.

The receiver may be a wireless receiver.

The one or more lighting parameters may include one or more of:
  one or more desired wavelengths of light;
  an intensity of light required at one or more wavelengths;
  a proportion of total light intensity at a plurality of wavelengths;
  a time at which one or more of the other lighting parameters should be applied; and
  instructions for specific LEDs in the LED array.

According to a further aspect of the invention, there is provided a horticultural system comprising:
  any controller disclosed herein,
  an LED array connected to the controller; and
  a database in communication with the controller, wherein the database has a plurality of sets of lighting parameters stored in it, and the database is configured to provide one or more of the plurality of sets of lighting parameters to the controller.

The horticultural system may further comprise:
  a driver configured to drive a forward bias current through an LED in the LED array, the current comprising a measurement current (Ilow) portion comprising a non-zero measurement current;
  a sampler configured to sample the forward bias voltage drop (Vf), and determine the forward bias voltage drop (Vflow) at the measurement current (Ilow); and
  a calculator configured to calculate the temperature of a junction of the LED from the determined forward bias voltage drop; and
  wherein the controller is configured to set the one or more operating parameters of the LED array in accordance with the calculated temperature of the junction of the LED.

The sampler may be configured to analyse the samples to find a forward bias voltage drop which corresponds to a peak in the number of occurrences of that voltage drop.

The calculator may comprise a memory that is configured to store a transformation function that represents the voltage-temperature characteristics at the measurement current.

There may be provided an integrated circuit comprising any controller described herein.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be provided as firmware, or may be embodied as a transient signal. Such a transient signal may be a network download, including an internet download.

A description is now given, by way of example only, with reference to the accompanying drawings, in which:

BRIEF DESCRIPTION OF THE DRAWINGS

FIG. 1 shows a controller for a horticultural lighting system;

FIG. 2 shows a horticultural lighting system;

DETAILED DESCRIPTION

Figure 3:
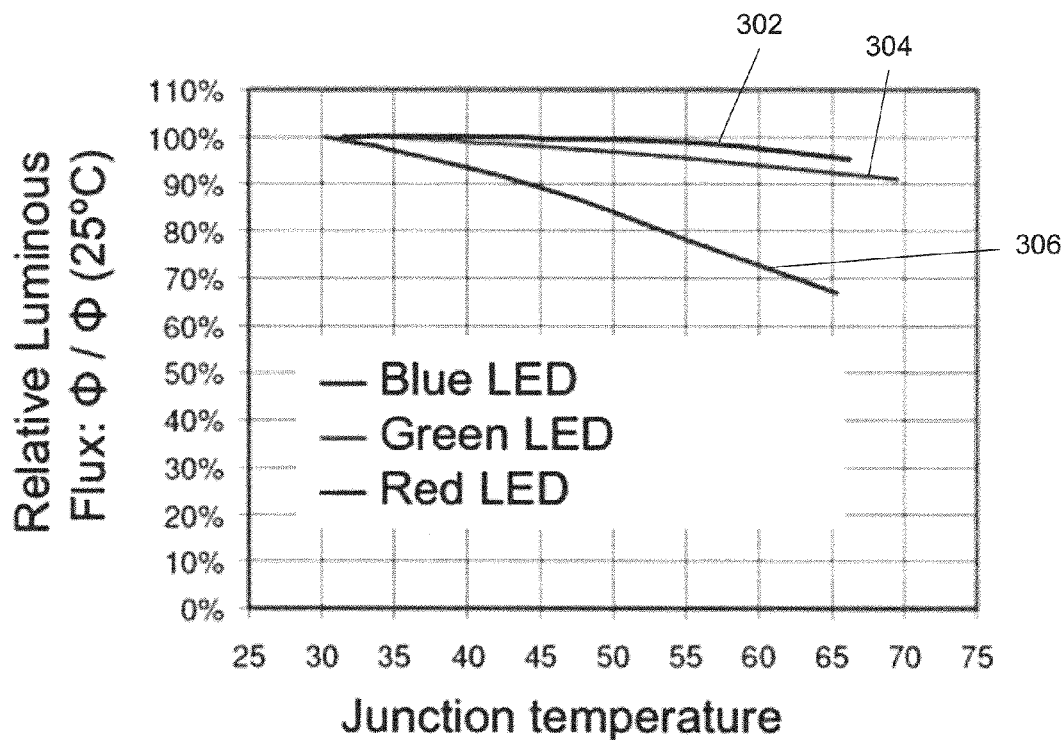
FIG. 3 shows a plot of relative luminosity on the vertical axis versus junction temperature on the horizontal axis, for three LEDs.

Examples disclosed in this document relate to a horticultural lighting system that can be used to adaptively set one or more parameters of a light emitting diode (LED) array, such as the intensity of light at various different wavelengths, in accordance with a received set of lighting parameters. Such a set of lighting parameters may be referred to as a lighting recipe. Advantageously, an updated or replacement lighting recipe can be received and applied by the lighting system such that the system can be conveniently adapted for growing different crops that have different lighting requirements, and/or to take advantage of technological advances in the understanding of the light required by plants, therefore enabling improved and more efficient plant growth. Also, in some examples, one or more parameters of the LED array can be set in accordance with a temperature of an LED junction, which can advantageously be determined without requiring a temperature sensor.

LEDs can be considered useful in horticultural applications as they can be designed to emit specific wavelengths of light, the light output can be tuned to a 'horticultural optimum', when used with a heat sink their heat output can be distributed over a relatively large area therefore requiring less airflow for cooling, and their use can result in higher effective efficiency. Also, the emitted light can have good homogeneity, and LEDs can already provide an acceptable level of energy consumption.

FIG. 1 shows a controller 102 for a horticultural lighting system. The controller 102 may be for a single luminaire, which includes an LED array 110. Therefore, for horticultural lighting systems that include a plurality of luminaires, a plurality of controllers 102 may also be provided.

The controller 102 comprises a receiver 104 for receiving a set of lighting parameters, also referred to herein as a lighting recipe. The receiver 104 may simply be a pin/terminal of an integrated circuit. In the example of FIG. 1, the receiver 104 is a wireless receiver. Use of a wireless receiver can be beneficial because the controller 102 and an associated luminaire can be easily installed into an existing greenhouse or plant factory without having to install significant additional cabling. It will be appreciated that the receiver 104 may be provided as a transceiver in examples where the controller 102 also transmits information, optionally wirelessly.

The lighting recipe may be considered as a lighting parameter file and may include one or more of the following lighting parameters:
- one or more desired wavelengths of light, for example wavelengths that correspond to red or blue light;
- an amount of photon flux/intensity of light required at one or more wavelengths. For example, the lighting recipe can be used to deliver maximum flux or constant flux;
- a proportion of total light intensity required at a plurality of wavelengths, for example 20% red light, 20% far-red light, 40% blue light and 20% white light;
- a time at which one or more of the lighting parameters should be applied, for example between 19:00 and 07:00 (that is, when it is expected that there is no sunlight), for the first 20 days that the lighting recipe is used (that is, when the plants are at their early growth stage), for the $21^{st}$ to $40^{th}$ days that the lighting recipe is used (that is, when the plants are at a mid-growth stage), etc.,
- instructions for specific LEDs in an LED array, including an indication of whether or not an LED in the LED array should be switched on and to what intensity, for example an instruction to turn on LEDs 1 to 10 at half power and completely turn off LEDs 11 to 20.

Different lighting recipes and parameter settings may be particularly well suited to different plants and to plants at different stages of development. Also, as the scientific understanding of plants' lighting needs for photosynthesis improves, the lighting recipes may be correspondingly improved.

The controller 102 also includes an output terminal 106 for providing lighting control signalling 108 to an LED array 110, such that the lighting control signalling can set one or more operating parameters of the LED array in accordance with the received set of lighting parameters. In this example, the lighting control signalling 108 is provided to an LED driver circuit 112, which in turn provides control signals and power to specific LEDs or strings of LEDs in the LED array 110. The LED driver circuit 112 may perform any processing that is necessary to convert the received lighting control signalling 108 into signals that are suitable for driving the LEDs. The LED array 110 may be a one-dimensional or two-dimensional array comprising a plurality of LEDs. For example, the LED array 110 may comprise LEDs that are electrically grouped in serial strings of the same colour. Optionally, LEDs may be physically located in the array such that they are grouped in lines or blocks of the same colour, or mixed with LEDs of different colours.

In this example the LED array 110 includes four LED strings: a red LED string, which may have a wavelength within the range of about 630-740 nm; a blue LED string, which may have a wavelength within the range of about 380-450 nm; a far-red LED string, which may have a wavelength within the range of about 710-850 nm; and a white LED string, which may have a spectrum of about 390-700 nm. It will be appreciated that any LEDs can be used that provide light at a wavelength that is considered useful for plants to grow, or to assist in managing the horticultural system in any way, including providing white light so that a person can visually inspect the plants that are illuminated by the LED array.

In some examples, the LED array 110, the LED driving circuit 112 and a light fixture (not shown in FIG. 1) may be referred to together as a luminaire Advantageously, after a predetermined period of time, or in response to user input, the controller 102 may receive a second lighting recipe at the receiver 104. The second lighting recipe may differ from an earlier lighting recipe in that it may be for a different type of plant, for a different growing stage of the plant, or may be based on improved scientific data for the same type of plant. The lighting control signalling can then be used to set one or more operating parameters of the LED array 110 in accordance with the second set of lighting parameters. Providing a horticultural lighting system that can control the lighting in accordance with a received lighting recipe can represent a flexible and adaptable system when compared with a system that is hard-coded with a lighting recipe. For example, the system can be used at a high efficiency level for different types of plants without wasting unnecessary energy by providing light that has not been specifically identified as beneficial for a particular plant.

Optionally, the controller 102 can store the received lighting recipe in memory (not shown in FIG. 1). In examples where a second lighting recipe (comprising a second set of lighting parameters) is received at the receiver 104, the controller 102 can replace in memory the earlier lighting recipe with the second lighting recipe. Alternatively, the controller 102 may be configured to access the lighting recipe from a remote location, as described in more detail below, such that the lighting recipe can be streamed in real-time and does not need to be stored locally. This can, in some applications advantageously, improve the security and integrity of the lighting recipe data.

In the example of FIG. 1, the controller 102 also has an optional user input receiver 114, which may or not be wireless. The receiver 104 and the user input receiver 114 may be the same component/terminal or they may be separate but have the same functionally. For example, the receiver 104 may be a wireless receiver and the user input receiver 114 may be a wired receiver. In this proposed system, the user input can be received primarily at a wireless receiver because in this way the user can use a smart phone or tablet or computer to wirelessly interact with the system. For example, the user can receive feedback in relation to one or more of power levels, colour mix, LED failures, power usage and information received from a sensor. Also, the user may be able to wirelessly control the LED array.

The user input receiver 114 can receive user input signalling representative of how the user would like to operate the LED array 110. For example, the user may wish to override, further develop or tune the instructions contained in a received lighting recipe, or request a replacement lighting recipe. The controller 102 can then set one or more operating parameters of the LED array in accordance with the user input signalling, for example the controller may adapt the settings for the one or more operating parameters of the LED array that were determined with reference to the lighting recipe, in accordance with the user input signalling. Such functionality can enable an end user to provide local control to modify performance of the lighting system to suit their specific needs or to more generally reconfigure the lighting system.

The controller 102 of FIG. 1 also has an optional sensor signal receiver 116. The sensor signal receiver 116 can receive sensor signalling representative of one or more characteristics of the environment in which the plants are growing, or characteristics of any of the hardware associated with the horticultural system, including the LED array 110. The environment may be a controlled environment such as a greenhouse or plant factory. Such sensor signalling may be received from one or more external sensors. Alternatively, the sensor signalling may be received from the LED driver circuit 112, and the sensor signal receiver 116 can be considered as an interface to certain parts of the LED driver circuit 112 in order to determine a junction temperature of LEDs in the LED array 110. Further examples of sensor signalling are provided below with reference to FIG. 2.

The controller 102 can then set one or more operating parameters of the LED array in accordance with the sensor signalling, for example the controller may adapt the settings for the one or more operating parameters of the LED array that were determined with reference to the lighting recipe in accordance with the sensor signalling.

It will be appreciated that the user input receiver 114 may be provided as a transceiver in examples where the controller 102 also transmits information to a user, optionally wirelessly. Such an example is described below with reference to FIG. 2.

FIG. 2 shows a horticultural lighting system 200. The system 200 includes lamps and luminaires 210, which can include one or more LED arrays, and a controller 202 such as the controller that is described above with reference to FIG. 1. The controller 202 of FIG. 2 has a transceiver 220 that can receive the lighting recipe and/or the user input signalling from an IP gateway 222. The IP gateway can communicate with the controller using a 6LowPAN or ZigBee low power radio frequency (RF) network, for example. The controller can be hard-wired with, or in wireless communication with, one or more sensors 224, as will be described below.

A lighting recipe provider or broker 226 is shown in FIG. 2 as providing lighting recipes to the IP gateway 222 via network 228 such as the 'cloud' or the internet. The lighting recipe provider or broker 226 may be located remotely from the controller 202 and the lamps and luminaires 210, and can include a database 227 that stores a plurality of lighting recipes that can be provided to the controller 202. In this way, cloud based lighting recipe and algorithm management can be performed. Multiple lighting recipe providers may be able to contribute to the database 227. In this way, it may be possible for a lighting recipe broker to manage the database 227, provide and maintain quality control on what goes into the database 227, and provide information to users about what is in the database 227.

In this example, the IP gateway 222 can also provide sensor signalling 230 back to the lighting recipe provider 226 via the network 228. The IP gateway 222 may receive the sensor signalling from the controller 202, or directly from the sensors 224. The lighting recipe provider 226 can utilise feedback provided by the sensors 224 to develop and provide new lighting recipes. In this way a feedback loop is provided that can be used to improve lighting recipes.

The IP gateway 222 may be equipped with a chip that is configured to provide secure lighting recipe downloading and/or real-time lighting control. This may require certain type of security servers in the cloud. In some examples, known encryption methods may be used to maintain the security of the lighting recipe data, or any other authentication scheme and secure way of handling any necessary encryption keys may be used. For example, the controller 202 may have an AES encryption engine.

Also shown in FIG. 2 is a local user's processing device 232, which may be a mobile telephone, a tablet, a laptop computer or any other computer processing device. A local user can use the local user's processing device 232 to receive feedback from the horticultural system, such as information returned from the sensors 224, details of a lighting recipe that is being used, or any other feedback information. Also, the local user's processing device 232 can be used to provide details of how the user would like to operate the lamps and luminaires 210, for example to override, further develop or tune the instructions contained in the lighting recipe. One such example may be to increase the white light that the lamps and luminaires provide because the user would like to visually inspect the plants. Another example is for the user to increase the intensity or proportion of light with a certain wavelength in line with recent scientific developments. In some examples it may be more convenient or quicker to adjust the lighting in this way rather than wait for an updated lighting recipe. The local user's processing device 232 can then provide the appropriate user input signalling to the controller 202, either directly or indirectly, such that the settings for the one or more operating parameters of the lamps and luminaires 210 can be adapted accordingly.

The sensors can include one or more of the following:

a carbon dioxide sensor configured to provide sensor signalling representative of the amount of carbon dioxide in the plants' environment, for example in a greenhouse that houses the plants;

a vapourised organic compound (VOC) sensor configured to provide sensor signalling representative of the amount of vapourised organic compounds in the plants' environment;

an external/natural light sensor configured to provide sensor signalling representative of the intensity and/or frequency spectrum of natural light that is also provided to the plants;

a temperature sensor configured to provide sensor signalling representative of the temperature of the plant's environment;

a relative humidity sensor configured to provide sensor signalling representative of the relative humidity of the plant's environment;

an air flow sensor configured to provide sensor signalling representative of air flow through the plants' environment;

a timer sensor configured to provide sensor signalling representative the passing of time, for example time elapsed since the system was reset or since the plants were planted or reached a predetermined stage in their growth. This can take into the fact that bigger/older plants will require more light than smaller/younger plants.

The various types of sensor signalling mentioned above can be automatically used by the controller 202 to adjust the values of the one or more operating parameters of the lamps and luminaires 210 that would otherwise have been set in accordance with a received lighting recipe, for example to apply a weighting to one or more lighting parameter values. This can enable the lighting conditions to be adapted in line with external or environmental conditions. For instance, the one or more operating parameters can be adjusted such that sensor signalling more closely relates to a desired value that is indicated in a lighting recipe. In one example, a lighting recipe may call for a certain photon flux intensity of red light and a certain photon flux intensity of blue light, and the sensor signalling indicates that a certain amount of blue light is being received as natural lighting/daylight. Therefore, the controller 202 can use the sensor signalling to automatically update an operating parameter of the lamps and luminaires 210 such that the photon flux intensity of blue light provided by the lamps and luminaires 210 is decreased.

Also, the controller 202 can use one or more properties of a horticultural system operating schedule to adjust the values of the one or more operating parameters of the lamps and luminaires 210. For example, an operating schedule file may be stored in memory and accessible by the controller 202. The operating schedule file may include details of times at which the plants are fed and watered, and therefore can be used to determine a level of nutrients that is being provided to the plants. This level of nutrients, and any other information that could be derived from the operating schedule file, can be used to adjust the values of the one or more operating parameters of the lamps and luminaires 210 that would otherwise have been set in accordance with a received lighting recipe.

In some examples, the controller 202 can receive or determine a junction temperature signal representative of a junction temperature of one or more of the LEDs in the lamps and luminaires 210. The controller 202 can then control the one or more operating parameters of the lamps and luminaires 210 on the basis that the junction temperature affects the amount of light output by an LED and can also affect the wavelength of light output. In some examples, this control may be based on algorithms that account the influence of LED junction temperature and driving currents on LED light output and wavelength. That is, junction temperature (T) impacts flux (t) and wavelength, A. Further details of how the LED junction temperature can be used by the controller 202 are provided below with reference to FIGS. 3 to 5.

In order to determine junction temperature, the controller 202 can bring an LED driver circuit into a certain low power state periodically for a predetermined period of time, perhaps a few microseconds, during which time measurements are taken that can be used by the controller to determine what the junction temperatures of the LEDs are. Based on the determined junction temperatures, the controller 202 can adjust one or more driving parameters for the LEDs in a way that can achieve certain objectives such as to maintain maximum flux, to maintain constant flux, to protect LEDs against failure by overheating, etc. Further details are provided below.

FIG. 3 shows a plot of relative luminosity on the vertical axis versus junction temperature on the horizontal axis. Data is shown for each of a blue LED 302, a green LED 304 and a red LED 306. It can be seen that as the junction temperature increases the relative luminosity decreases for each of the different coloured LEDs.

As junction temperature (T) changes, flux/luminosity ($\varphi$) changes, which could lead to a current (I) adjustment. Such a current adjustment can lead to a further junction temperature (T) change, which can lead to another current adjustment, and so on. If junction temperature (T) is not precisely known, this can lead to thermal runaway. However, if junction temperature (T) is known then the flux output and the color point can be accurately set. For the horticultural systems disclosed in this document, details of the junction temperature can be particularly beneficial because the requirements of the lighting recipe can be more accurately met.

Figure 4:
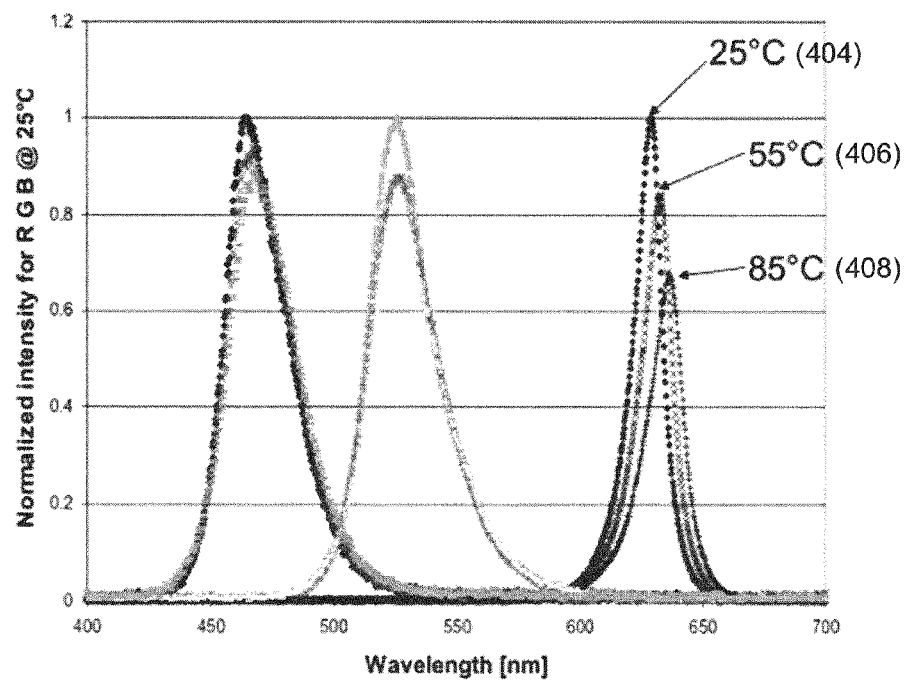
FIG. 4 shows a plot of normalized light intensity for red green blue (RGB) at 25° C. on the vertical axis versus wavelength on the horizontal axis, for three LEDs.

FIG. 4 shows a plot of normalized light intensity for red green blue (RGB) at 25° C. on the vertical axis versus wavelength on the horizontal axis. Data is shown for the junction temperature at 25° C. with reference 404, the junction temperature at 55° C. with reference 406, and the junction temperature at 85° C. with reference 408. It can be seen that as the junction temperature increases, the intensity of light with different wavelengths decreases differently. More particularly, the intensity of light with higher wavelengths decreases more rapidly than the intensity of light with lower wavelengths. Also, the intensity of light can vary with respect to junction temperature differently dependent on an LED material system that is used. Therefore, the relationship between junction temperature, flux/luminosity ($\varphi$), and wavelength can be LED family specific.

Figure 5:
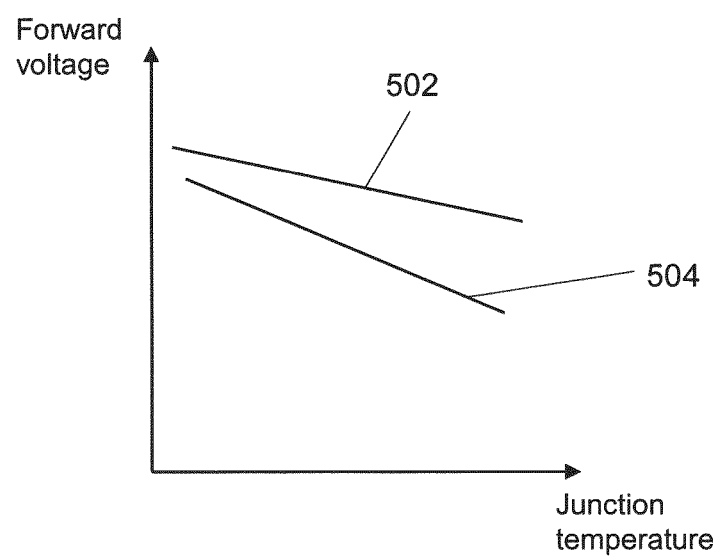
FIG. 5 shows schematically a relationship between forward voltage of an LED on the vertical axis and junction temperature on the horizontal axis, for two LEDs.

FIG. 5 shows schematically a relationship between forward voltage of an LED on the vertical axis and junction temperature on the horizontal axis. A first plot 502 shows the relationship for a first type of LED, and a second plot 504 shows the relationship for a second type of LED. The different types of LEDs may be made from different materials, for example. It will be appreciated from FIGS. 3 to 5 that, if the forward voltage of an LED is known, then the junction temperature can be determined (using the relationship of FIG. 5), and if the junction temperature is known, then the associated effect on light intensity at different wavelengths (using the relationships of FIGS. 3 and 4) can be determined. In turn, this can allow an LED to be controlled such that it can accurately provide a desired light output, in terms of at least wavelength and intensity.

Data representative of the relationships shown in FIGS. 3 to 5 can be stored in memory associated with, or accessible by, any of the controllers disclosed herein. In some examples, data representative of a plurality of such relationships can be stored in memory, wherein the plurality of relationships are for different types of LEDs, and the controller can access the relationships that are applicable to specific LEDs that are being used.

In some examples, the controller can measure the junction temperature of an LED with good accuracy by using a measurement current (Ilow) portion that comprises a low level ($I_{low}$) current. The measurement current (Ilow) portion may be at a current level that is lower than an operational current of the LED, and may be considered as a a small "downtime" of perhaps a few microseconds for the measurement. The controller may periodically drive the LED with the measurement current in order to update a determined value for the junction temperature. Operation of the LED in this way is not limited to any specific driving method; it can be used with pulse width modulation (PWM), direct current (DC) or amplitude modulation (AM) for example.

The controller can apply square wave current pulses to drive the LED, in which the high level ($I_{high}$) is an operational current of the LED and the low level ($I_{low}$) is a measurement current. By monitoring the forward voltage (Vf) of the LED over time, two dominant values will be found (if the operational current is constant over the monitoring period), one of which is representative of the real temperature at the LED junction during operation.

The controller, or another processor in the system can include a driver for driving a forward bias current through an LED in the LED array, the current comprising a square wave which toggles between high and low current values, the high current value ($I_{high}$) comprising an LED operation current, and the low current ($I_{low}$) comprising a non-zero measurement current. The measurement current ($I_{low}$) may be less than or equal to 1 mA. This driver may be a current source circuit. The controller or other processor may also include a sampler for sampling the forward bias voltage drop (Vf), and determining the forward bias voltage drop ($Vf_{low}$) at the measurement current ($I_{low}$). The sampler can analyse the samples to find a forward bias voltage drop which corresponds to a peak in the number of occurrences of that voltage drop.

The controller or other processor may also include a calculator for calculating the temperature of a junction of the LED from the determined forward bias voltage drop. The controller can set the one or more operating parameters of the LED array in accordance with the calculated temperature of the junction of the LED. The calculator may comprise a memory that stores a transformation function that represents the voltage-temperature characteristics at the measurement current.

In some examples the controller can determine the dominant output wavelength of an LED. The controller may be configured to: determine an electrical characteristic of the LED, which may be dependent on voltage-capacitance characteristics; and analyse the electrical characteristic to determine the dominant output wavelength. This can enable the dominant wavelength of an LED to be determined in a simple manner, without the need for analysis of the optical output. Also, this can enable variations between devices at manufacture to be compensated. For example, the analysis can comprise determining the phase, and deriving the dominant output wavelength from the phase. In one example, deriving the dominant output wavelength from the phase can comprise determining the phase difference from 90 degrees.

The dominant output wavelength can be determined by comparing the determined electrical characteristic with sample data which has been derived by analysing the relationship between the voltage-capacitance characteristic and the dominant output wavelength for sample LED devices. Thus, sample devices can be analysed optically in order to build a model of the device variations. This model can then enable a simple wavelength determination based only the measured electrical characteristics, for example a phase measurement. Information about the output intensity characteristics of the LED can also be determined from the electrical characteristic, using a suitable model that relates the output wavelength to the intensity profile. Advantageously, the controller can then control an LED in dependence on the determined dominant output wavelength. Therefore, the control of the LED can be modified so that a desired output colour can be obtained despite variations between different LED devices.

Further details of LED control in accordance with a determined LED junction temperature are disclosed in U.S. 2011/0031903 A1, U.S. 2010/0315019 A1 and U.S. 2010/0308833 A1, the entire contents of which are hereby incorporated by reference.

Determining the junction temperature can be beneficial as it can allow a significant downsizing of heat-sinks and the luminaire itself, when compared with LED luminaires that use over-dimensioned heat-sinks to protect against LED failure. Determining the junction temperature can also allow LEDs to be driven harder, for example 20% harder, than would be the case, thereby reducing the number of LEDs needed. These advantages are particularly well suited to horticultural systems, and especially horticultural systems that can receive a set of lighting parameters (lighting recipe) from a remote location.

Further still, determining and using the junction temperature as described above can enable accurate control and better reproducibility, for example to provide constant photon flux over time and temperature, which in the horticultural industry can have a positive impact on yields.

One or more of the examples described in this document can be used with horticultural systems that rely solely on artificial light. That is, they do not use any natural light at all, or only a small amount of natural light, as may be the case with multi-layer/vertical farming.

One or more of the following benefits for the farmer can be achieved:
State-of-the-art cost-effective, energy-efficient lighting for every crop using configurable/controllable LED luminaires;
Downloadable luminaire configurations and lighting scripts;
Using mobile phone, tablet or PC:
Monitor energy consumption and sensor data;
Fully control LED color and flux;
Develop or tune lighting scripts;
Use latest scientific insights through lighting recipes developed by leading institutes and developers;
Profit from continuous improvement of lighting recipe effectiveness; and
Change crop without re-investing in luminaire hardware.
One or more of the following benefits for the lighting recipe developer can be achieved:

Secure, low cost distribution channel for lighting control IP;

Channel for on-line horticulture lighting control (lighting-as-a-service concepts); and Channel for real-time sensor feedback collection to optimize lighting recipe performance.

One or more of the following benefits for the horticulture luminaire maker can be achieved:

Cost-effective, configurable and low power lighting systems;

Differentiation through bundling or co-marketing of lighting recipes, software tools, etc.; and Reduction of luminaire model diversity.

Using the junction temperature to control the LED can be considered advantageous, in some examples when compared with a system that uses an optical, or another type of, sensor, because of one or more of the following reasons:

no external sensor may be required;

it can reduce or eliminate the need for a heat sink, which can reduce weight and cost. For example, a metal radiator-type heat sink may be used to discharge heat generated by the LED's and keep the junction temperature down. As much as kilograms of metal may be taken out in high power luminaires. Also, "over-dimensioned" heat sinks may not be required to accommodate uncertainty about the actual junction temperature, as it can be accurately determined. Further still, water cooling may not be required to reduce the temperature of the LEDs.

no extra wiring may be required for a communication channel;

a reliable system can be provided;

low power consumption can be achieved;

a high accuracy can be obtained, for example a resolution of about 1° C.;

dynamic light control can be provided;

it can be independent of the LED operating conditions, such as for example whether pulse width modulation (PWM) or amplitude modulation (AM) or a combination of these is used, or various frequencies of operation; and it can self-calibrate to compensate for changes in LED performance due to aging.

Examples disclosed in this document relate to a programmable system for the illumination of plants to enable them to grow effectively and efficiently. Also, a programmable illumination system can provide flexibility and improved/optimization of lighting conditions, for example with a crop change or illumination that benefits from being adjusted to account for external parameters.

In horticulture, the amount and type of illumination determines the way plants grow and develop. Examples disclosed in this document can be considered better than systems that use lamps to provide illumination that is fixed in spectrum and largely fixed in intensity. For optimum growth, different plants require different illumination conditions. Flexible illumination conditions, as described herein, can enhance the growth of a variety of plants, both for plants of different types, at different stages of development, to stimulate growth of particular features, to switch quickly between different types of plants, to adjust to new knowledge of the way plants develop, and to accommodate to different growing conditions like nutrients, natural lighting conditions or temperature and humidity.

Databases with a variety of lighting control schemes/scripts/schedules (called a lighting recipe) may be made available to plants growers such that a plant grower can select a lighting recipe out of the database. In order to maintain the integrity of the lighting recipe data, and possibly to reduce the likelihood that a plant grower uses an out-of-date lighting recipe thereby reducing energy efficiency, the lighting recipe may be provided for a limited period of time and in a secure mode. Communication between the database and a controller may satisfy one or both of the following two security requirements, in some examples:

to avoid the plant grower controlling the light without regular interaction with the database; and if the connection between database and controller is broken for a prolonged period, the controller may be able to run independently (for example by switching to default setting or to freeze the existing setting).

In some examples the database can be periodically interrogated by the controller to retrieve a next set of illumination parameters. Alternatively, a sequence of illumination parameters can be downloaded and stored, wherein the sequence is stored in such a way that it can only be used a predetermined number of times, for example only once.

The controller can be used to steer several LED drivers and set different parameters for different LED arrays/luminaires. This can be considered as more flexible than a luminaire that provides fixed colors with a fixed intensity.

The invention claimed is:

1. A controller for a horticultural lighting system comprising:

a receiver configured to receive a set of lighting parameters; and one or more output terminals configured to provide lighting control signaling to an LED array, wherein the lighting control signaling is configured to set one or more operating parameters of the LED array in accordance with the received set of lighting parameters;

wherein the controller is configured to receive or determine a junction temperature representative of a junction temperature of one or more LEDs in the LED array, wherein the controller is configured to also set one or more operating parameters of the LED array in accordance with the junction temperature; and wherein the controller is configured to command a driver to drive a forward bias current through an LED in the LED array, the current comprising a measurement current (Ilow) portion comprising a non-zero measurement current;

further comprising, a sampler configured to sample a forward bias voltage drop (Vf), and determine the forward bias voltage drop (Vf) at the measurement current (Ilow); and a calculator configured to calculate the junction temperature of the LED from the determined forward bias voltage drop; and wherein the controller is configured to set the one or more operating parameters of the LED array in accordance with the calculated junction temperature of the LED.

2. The controller of claim 1, wherein, following receipt of a second set of lighting parameters received at the receiver, the lighting control signaling is configured to set one or more operating parameters of the LED array in accordance with the second set of lighting parameters.

3. The controller of claim 2, wherein the controller is configured to store the received set of lighting parameters in a memory.

4. The controller of claim 3,
wherein, following receipt of a second set of lighting parameters received at the receiver, the controller is configured to replace in the memory the received set of lighting parameters with the second set of lighting parameters.

5. The controller of claim 1,
wherein the controller is configured to receive the set of lighting parameters in real-time, optionally from a location remote to the LED array.

6. The controller of claim 1,
further comprising a user input receiver configured to receive user input signaling, and
wherein the controller is configured to also set one or more operating parameters of the LED array in accordance with the user input signaling.

7. The controller of claim 1,
further comprising a sensor signal receiver configured to receive sensor signaling representative of one or more characteristics of an environment in which plants are growing, or characteristics of any of hardware associated with the horticultural system, and
wherein the controller is configured to also set one or more operating parameters of the LED array in accordance with the sensor signaling.

8. The controller of claim 1,
wherein the controller is configured to use one or more properties of an operating schedule file to set one or more operating parameters of the LED array.

9. The controller of claim 1,
wherein the receiver is a wireless receiver.

10. The controller of claim 1, wherein the set of lighting parameters include one or more of:
one or more desired wavelengths of light;
an intensity of light required at one or more wavelengths;
a proportion of total light intensity at a plurality of wavelengths;
a time at which one or more of other lighting parameters should be applied; and
instructions for specific LEDs in the LED array.

11. A horticultural system comprising:
the controller of claim 1,
the LED array connected to the controller; and
a database in communication with the controller,
wherein the database has a plurality of sets of lighting parameters stored in it, and the database is configured to provide one or more of the plurality of sets of lighting parameters to the controller.

12. The controller of claim 1,
wherein the sampler is configured to analyze samples to find a forward bias voltage drop which corresponds to a peak in a number of occurrences of that voltage drop.

13. The controller of claim 1,
wherein the calculator comprises a memory that is configured to store a transformation function that represents voltage-temperature characteristics at the non-zero measurement current.

14. The controller of claim 1:
wherein the forward bias current further includes a high level ($I_{high}$)operational current of the LED.

15. The controller of claim 1:
wherein the controller is further configured to toggle between a high level ($I_{high}$) operational current of hte LED and the non-zero measurement current (Ilow).

* * * * *